United States Patent [19]
Okamoto et al.

[11] Patent Number: 6,139,088
[45] Date of Patent: *Oct. 31, 2000

[54] AUTOMOBILE DOOR

[75] Inventors: Shinichi Okamoto; Keizo Nishitani; Yoshihito Aoki; Akio Minami; Mitsunobu Kato, all of Shizuoka, Japan

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/759,418

[22] Filed: Dec. 5, 1996

[30] Foreign Application Priority Data

Dec. 8, 1995 [JP] Japan ................................. 7-320524

[51] Int. Cl.[7] .......................................................... B60J 5/04
[52] U.S. Cl. .................................. 296/146.6; 296/146.7; 296/146.1; 49/502
[58] Field of Search ............................ 296/146.5, 146.7, 296/146.1, 146.6, 152; 439/34; 49/502

[56] References Cited

U.S. PATENT DOCUMENTS

| | | | |
|---|---|---|---|
| 3,791,693 | 2/1974 | Hellriegel et al. | 296/146.7 |
| 4,702,040 | 10/1987 | Hellriegel | 49/502 |
| 4,790,590 | 12/1988 | Ito et al. | 296/146.1 |
| 4,824,164 | 4/1989 | Nakayama et al. | 296/146.5 |
| 4,869,670 | 9/1989 | Ueda et al. | 296/146.7 X |
| 4,882,842 | 11/1989 | Basson et al. | 296/146.5 X |
| 4,945,682 | 8/1990 | Altman et al. | 49/502 |
| 4,956,941 | 9/1990 | Vaughan | 49/502 X |
| 5,040,334 | 8/1991 | Dossin et al. | 296/146.5 X |
| 5,095,659 | 3/1992 | Benoit et al. | 296/146.7 X |
| 5,460,530 | 10/1995 | Toba et al. | 439/34 |
| 5,548,930 | 8/1996 | Morando | 296/146.5 X |

FOREIGN PATENT DOCUMENTS

| | | |
|---|---|---|
| 34 41 960 A1 | 5/1986 | Germany . |
| 36 09 609 C2 | 10/1987 | Germany . |
| 3835-163 | 4/1990 | Germany ................. 49/502 |
| 40 19 787 A1 | 1/1991 | Germany . |
| 690 00 529 T2 | 5/1993 | Germany . |
| 44 44 406 A1 | 6/1996 | Germany . |
| 1-249516 | 10/1989 | Japan . |
| 4-303086 | 10/1992 | Japan . |
| 5-42825 | 2/1993 | Japan . |
| 6-45817 | 6/1994 | Japan . |

*Primary Examiner*—Joseph D. Pape
*Assistant Examiner*—Jason Morrow
*Attorney, Agent, or Firm*—Armstrong, Westerman, Hattori, McLeland & Naughton

[57] ABSTRACT

An automobile door that is significantly easy to fabricate, enhanced in ease of assembling door components, and reduced in the number of parts to be mounted. The door comprises an outer panel and an inner panel. The inner panel is composed of a main panel made of metal and a resin-molded sub panel formed integrally with the main panel. The inner panel is formed with a mount on which door functional parts to be mounted on the door are mounted. The inner panel is also formed integrally with electrically connecting means for connecting these door functional parts with each other.

12 Claims, 9 Drawing Sheets

AUTOMOBILE DOOR

BACKGROUND OF THE INVENTION

1. Field of the Invention

The present invention relates to an automobile door and, more particularly to an automobile door that is easy to fabricate, enhanced in ease of assembling door functional parts, and significantly reduced in the number of door-associated parts.

2. Description of the Related Art

Japanese Patent Publication (Unexamined) No. Heisei 1-249516 discloses a method in which door functional parts are mounted between the outer and inner panels of a door for automobile before these panels are coupled together.

The disclosed method will be described in more detail. Referring to FIG. 10, reference character "a" indicates an outer panel, reference character "b" indicates an inner panel, and reference character "c" indicates a trim board. The inner panel "b" is made of an iron sheet formed with a coupling flange "b1" around the periphery of the inner panel except for the upper rim. The inside of the inner panel "b" is formed into a flat part-mounting recess "b2". The part-mounting recess "b2" is provided with many mounting holes "d" and tapped holes "e" in advance. By means of these holes, a window glass regulator "f", right and left glass guides "h1" and "h2" for guiding a window glass "g", a door check "i", a side door lock "k", and so forth are mounted that constitute door functional parts.

Reference character "l" indicates an outside handle, reference character "m" indicates an inside handle, reference character "n" indicates a door mirror bracket, reference character "o" indicates a reinforcement for reinforcing the inner panel "b", reference characters "p1" and "p2" indicate door hinges, and reference character "q" indicates a weather strip for sealing both panels "a" and "b". The outside handle "l" is mounted so as to be operatively associated with the side door lock "k" and the inside handle "m" via a door open control link "r" and a locking control link "s".

Referring to FIG. 10 again, because parts "f", "g" and so forth that constitute the door functional parts are mounted on the open surface of the inner panel "b" before the inner panel "b" is coupled to the outer panel "a", significant improvement in mounting work is expected for sure. However, the inner panel "b" is made of an iron sheet, therefore, fairly heavy and cumbersome to handle. Moreover, because a lot of door functional parts "f", "g" and so forth need to be mounted through the tapped holes "e" one by one, a lot of work steps to be done and a multitude of parts to be mounted still present problems to be solved.

If the inner panel "b" is made of resin alone, the door weight and the number of door functional parts may certainly be reduced, however, the resin-molded inner panel lacks mechanical strength and therefore it is difficult to make the inner panel stand alone as a door module with a lot of door functional parts mounted. To secure the mechanical strength, a special resin such as fiber-glass-reinforced plastic needs to be used, which inevitably pushes up the cost.

SUMMARY OF THE INVENTION

It is therefore an object of the present invention to provide an automobile door that is light in weight, high in mechanical strength, and small in the number of door functional parts to be mounted, thereby enhancing ease of assembling the automobile door.

In carrying out the invention and according to one aspect thereof, the automobile door comprises: an outer panel; and an inner panel mounted on an outer panel, said inner panel comprising a main panel made of metal and a resin-molded sub panel formed integrally with said main panel. Because the inner panel is partially made of resin, the entire inner panel is reduced in weight while the necessary mechanical strength thereof is ensured by the metal main panel even if the resin portion is reduced in thickness. This makes ordinary low-cost resin materials available for the inner panel, thereby lowering the door cost. Further, owing to the weight reduction for the entire door panel and the enhanced mechanical strength thereof, this present invention increases the number of functional parts that can be mounted on the door.

Preferably, the inner panel is formed with a mount on which door functional parts to be mounted on said automobile door are mounted, and said inner panel is integrally formed with electrical connecting means for connecting said door functional parts to each other. In the present invention, the inner panel is widely open on both sides and the mount facilitates attaching of door functional parts, so that the number of parts to be mounted is decreased, thereby significantly enhancing the efficiency of door assembling.

The inner panel is preferably attached on the automobile interior side thereof with a decoration panel.

The mount of the inner panel may be attached with a concentrated unit that incorporates a control circuit for controlling the above-mentioned door functional parts. The concentrated unit may contain also a switch unit associated with the door functional parts. Preferably, the concentrated unit further contains a power window motor and a door lock motor. A door wire harness is preferably divided into two parts; a panel wire harness and a trim wire harness. Preferably, the panel wire harness is arranged on the inner panel while the trim wire harness is arranged on the decoration panel.

In the present invention, the inner panel can be fabricated and carried into an assembly shop with the decoration panel mounted, allowing automobile manufacturers to significantly reduce the number of necessary fabrication steps and therefore enhance productivity.

As described above, the inner panel is mounted with the controller-incorporated concentrated unit which also contains the switch unit, the power window motor, and the door lock motor, so that the controller and the main door functional parts are arranged on the inner panel concentratedly. Thus, the door functions are complete in the door panel alone and the wire harness is simplified, so that the door inspection can be performed independently of the automobile main body. The present invention also simplifies the construction of the wire harness by dividing the same into the panel wire harness and the trim wire harness as described above.

BRIEF DESCRIPTION OF THE DRAWINGS

The present invention will be more apparent from the ensuring description with reference to the accompanying drawings wherein.

DETAILED DESCRIPTION OF PREFERRED EMBODIMENT

The present invention will be described in further detail by way of example with reference to the accompanying drawings.

Figure 1:
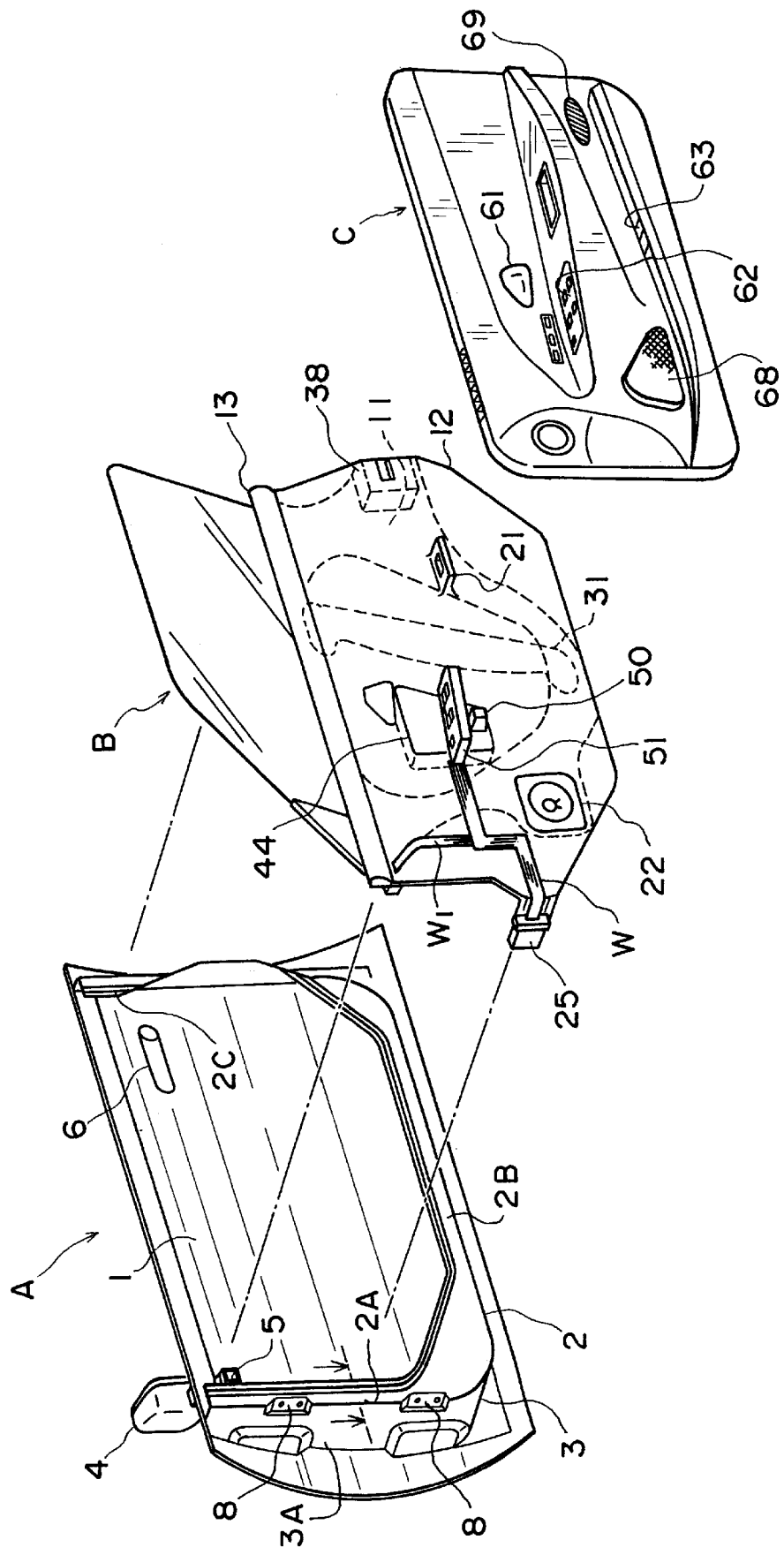
FIG. 1 is an exploded perspective view illustrating an automobile door according to an embodiment of the present invention.
Figure 2:
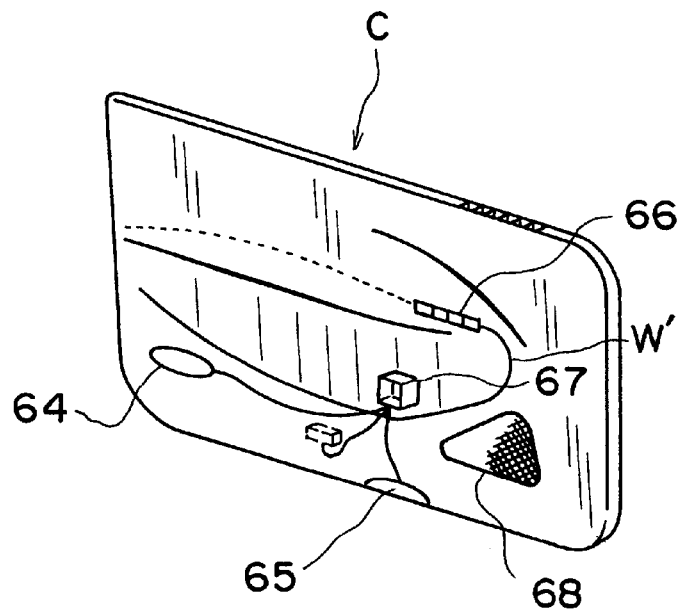
FIG. 2 is a perspective view illustrating the decoration panel of FIG. 1 with the rear side thereof frontward.
Figure 3:
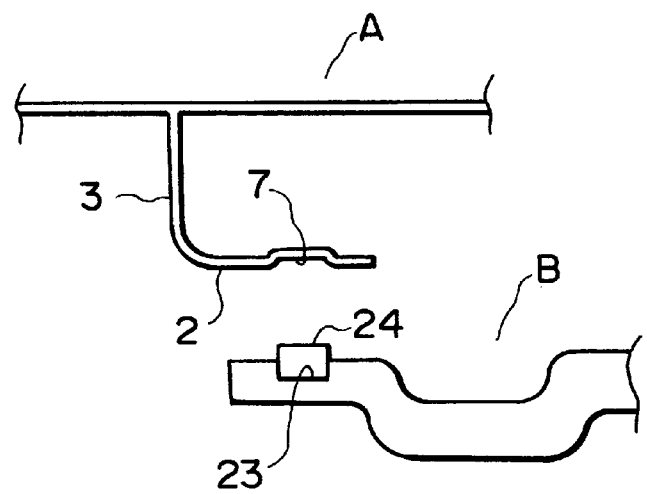
FIG. 3 is a main cross section illustrating waterproof mounting structures of the outer and inner panels of FIG. 1.

Now, referring to FIGS. 1 to 3, an automobile door according to an embodiment of the present invention comprises of an outer panel A, an inner panel B, and a decoration panel C called a trim board on the automobile interior side.

The outer panel A is made of a structural iron sheet as conventionally practiced and comprises an outer wall section 1, an interior sidewall rim section 2 composed of a narrow frontward rim section 2A, a lower rim section 2B, and a rearward rim section 2C that is opposed to the outer wall section 1, and a coupling section 3 for coupling the outer wall section 1 with the interior sidewall rim section 2. The interior sidewall rim section 2 is widely open to accept the inner panel B at the opening portion of the section 2.

In the outer panel A, the outer wall section 1 is fixed at the upper front corner thereof with a door mirror 4. On the inner side of that corner, a movable connector 5 for operating the door mirror 4 is mounted. On the upper rear corner of the outer wall section 1, an outside handle 6 is mounted. The interior sidewall rim section 2 is formed along the inner periphery thereof with a recess 7 (refer to FIG. 3) to be engaged with a waterproof packing 24 of the inner panel B for water-tight construction, which will be described later. In the corners of the frontward section 3A of the coupling section 3 and the frontward rim section 2A of the interior sidewall rim section 2A, hinge mounts 8 for door opening/closing are mounted in a recessed manner.

Figure 4:
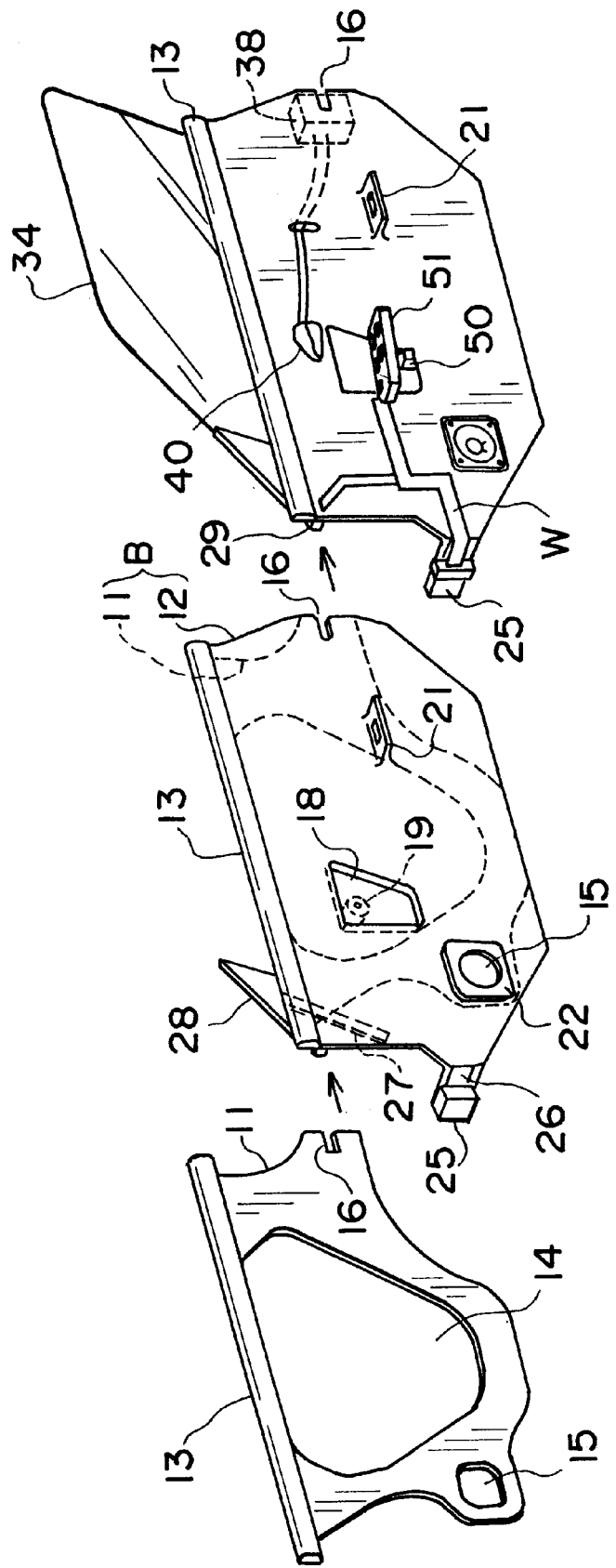
FIG. 4 is a perspective view illustrating the process of forming the inner panel of FIG. 1.
Figure 5:
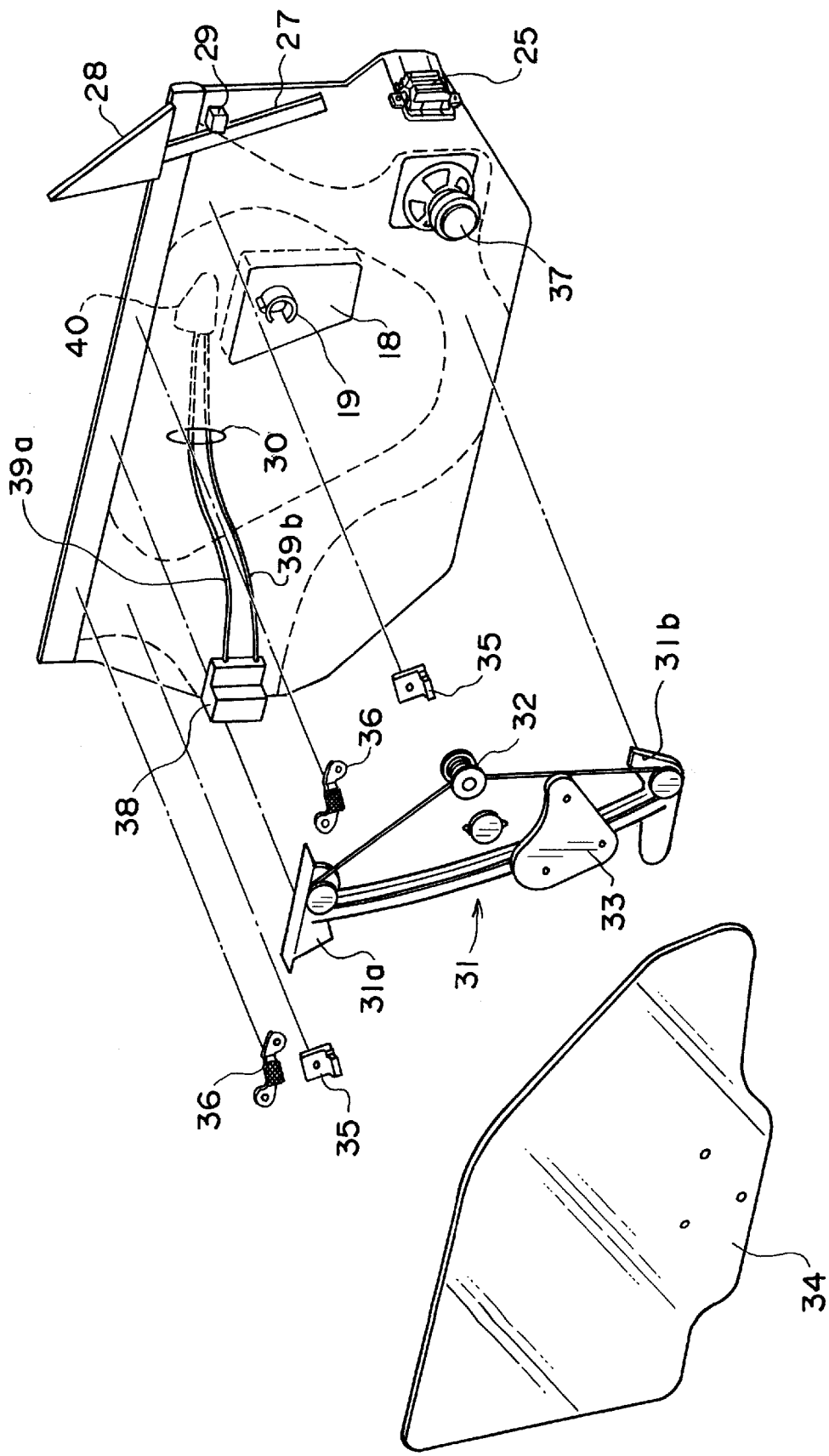
FIG. 5 is an exploded perspective view illustrating the mounting structure of the inner panel of FIG. 1.

Referring to FIGS. 4 and 5, the inner panel B is composed of a main panel 11 which is a generally flat structural iron sheet extending substantially the length of said outer panel, and a sub panel 12 which is resin-molded, and the main panel 11 and the sub panel 12 and formed in one unit. The inner panel B is mounted with almost all door functional parts provided on the door and, at the same time, with electrical connections such as a door wire harness and a door concentrated unit for electrically connecting and controlling the door functional parts.

The flat main panel 11 has a wide opening 14 in the central portion thereof, a speaker mounting hole 15 at one end, and a slit 16 for mounting a door lock unit (a mechanism section) at the other end. The main panel 11 is formed by blanking a structural iron sheet in a single operation, and is reinforced with a reinforcement 13 at the upper rim.

Because the sub panel 12 is mechanically supported for reinforcement by the main panel 11, the sub panel can be molded in a single unit through insert molding by use of an ordinary resin material such as polyethylene, polystyrene, or ABS resin. Insert molding allows the provision of the mounts necessary for mounting the door functional parts.

Figure 6:
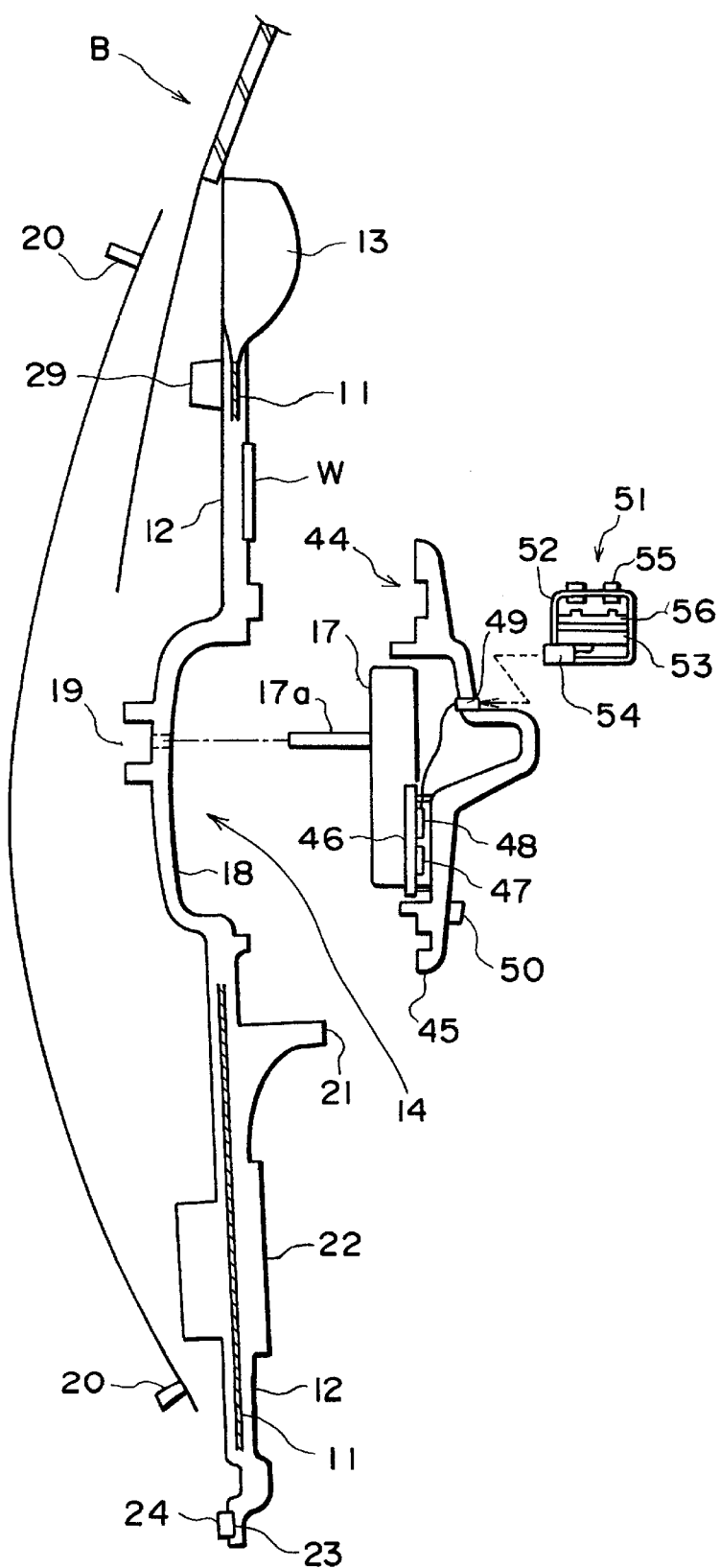
FIG. 6 is a main cross section of the inner panel of FIG. 1.

In other words, in the present embodiment, as shown in FIG. 6, by use of the wide opening 14 at the center of the main panel 11, a mount 18 for a power window motor 17 is formed toward the outside (on the side of the outer panel A, left in FIG. 6) in a bulged manner. On the outer side of the mount 18, a wire winding drum holder 19 for a window glass regulator 31 described below is arranged. On the upper and lower portions of the holder 19, pulley shafts 20 for the window glass regulator 31 are arranged projectively.

Figure 7B:
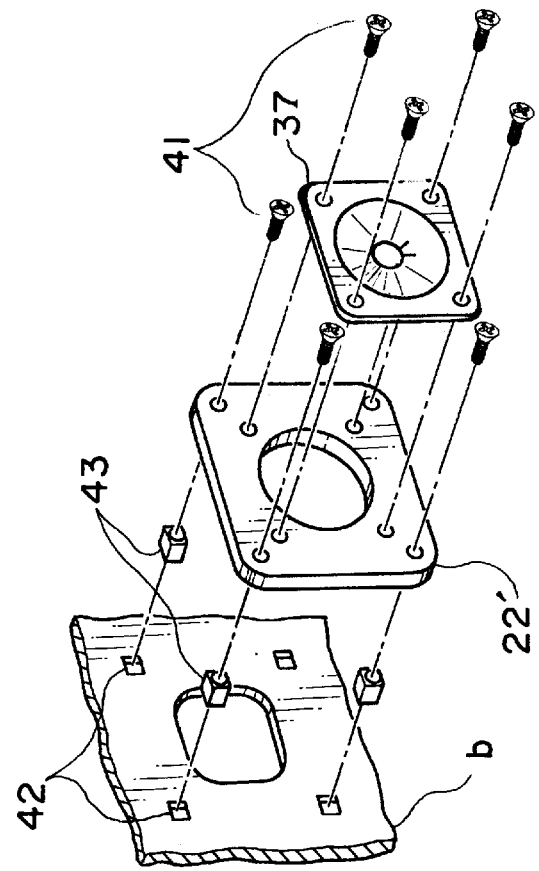
FIG. 7B is a perspective view illustrating conventional counterpart of FIG. 7A.
Figure 7A:
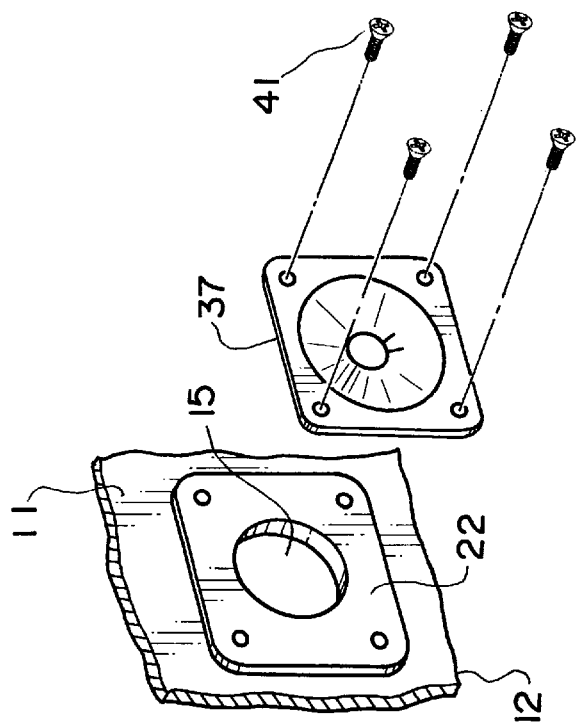
FIG. 7A is a perspective view illustrating a speaker mounting structure of the inner panel of FIG. 1.

Below the mount 18, a pull handle bracket 21 is projectively arranged integrally with the sub panel 12. Further, a speaker bracket 22 is arranged inside and outside of the periphery of the speaker mounting hole 15 of the main panel 11 as shown in FIG. 7A. As illustrated in FIG. 6, a groove 23 is arranged along the periphery of the main panel 11 or the sub panel 12 except for a portion arranged with the reinforcement 13. The groove 23 is attached with a waterproof packing 24 made of an elastic material such as rubber and mated with the recess 7 of the outer panel A as described above.

By use of inserting molding of the sub panel 12 with resin material, a connector housing 25 is integrally formed with the sub panel 12 via a bending section 26 on a side rim on the side of the speaker bracket 22 of the inner panel B. A panel wire harness W described below is connected to the housing 25 in a passing manner. Further, a window guide 27 attached at tip thereof with a delta sash guide 28 is integrally fixed to the sub panel 12 at the time of insert molding. Similarly, a connector housing 29 for the door mirror connector 5 can also be integrally formed with the sub panel 12.

The following describes the mounting of the door functional parts on the inner panel B formed as described above.

On the outer side of the inner panel B, as illustrated in FIG. 5, a wire winding drum 32 for the window glass regulator 31 is positioned to the drum holder 19, brackets 31a and 31b above and below the holder 19 respectively are fixed with bolts and nuts not shown, and a window glass 34 is mounted on a carrier 33. Before or after mounting the window glass 34, a pair of glass stops 35 and a pair of stabilizers 36 are fixed with screws and nuts not shown.

Referring to FIG. 7A, a speaker 37 can be directly fixed to the speaker bracket 22 with screws 41. On the contrary, in the conventional mounting, the inner panel "b" made of a structural iron sheet is provided with four square holes 42 as shown in FIG. 7B, grommet screws 43 are fixed in these holes, a speaker bracket 22' is fixed to the grommets with the screws 41, and then the speaker 37 is fixed to the bracket with the screws 41, thereby increasing the number of parts and the number of work steps.

As illustrated in FIG. 4, a door lock unit 38 is fixed to the main panel 11 through the slit 16 of the main panel 11. As illustrated in FIG. 5, a door open control link 39a and a locking control link 39b that are led from the door lock unit through a through hole 30 of the inner panel B to the inner side are coupled to an inner handle 40.

On the other hand, as illustrated in FIG. 1, on the inner side of the inner panel B, the panel wire harness W having a branch wire section W1 is arranged. A terminal not shown which is integrally formed with the branch wire section W1 is accommodated in the connector housing 29 for connection to complete a connector. The panel wire harness W is made of an ordinary flat cable or, preferably, a flexible flat cable fabricated by arranging plural strips of copper foil (conductors) in parallel to each other and coating the same for insulation. The resultant wire harness is fixed to the inner panel with adhesive; alternatively, the wire harness W may be fixed integrally with the inner panel at the time of insert molding. The wire harness W constitutes a door wire harness along with a trim wire harness W' described below.

Next, as shown in FIG. 6, the power window motor 17 is mounted on the mount 18, and a motor shaft 17a thereof is mated with the wire winding drum 32. A door concentrated unit 44 is mounted to the inner panel over the power window motor 17.

The door concentrated unit 44 accommodates, in a unit case 45 made of synthetic resin insulator, a control circuit board (a printed circuit board) 46 mounted with an electronic parts 47 and a connector 48. The unit case 45 is provided with a connector 49 for unit 44 connection and a connector 50 for decoration panel connection. The connector 49 is connected with a power window switch unit 51 via a connector 54. Like the door concentrated unit 44, the power window switch unit 51 accommodates, in a case 52, a printed circuit board 53 and the connector 54 that constitute a switch circuit. When a switch button 55 is depressed, a switch contact not shown on the printed circuit board 53 is turned on/off via a rubber 56. The connector 49 and the connector 54 are directly mounted on the board.

Referring to FIGS. 1 and 2 again, on the inner side (the automobile interior side) of the decoration panel C, an inner handle cover 61 is arranged at an upper portion of the panel, a switch decoration panel 62 for the power window switch unit 51 on the center protrusion of the panel, and a trunk lid and fuel lid switch 63 on the lower protrusion. On the outer side (on the inner panel B side) of the decoration panel C, a courtesy lamp 64, a foot lamp 65, and a sheet memory switch 66 are fixed along with the trim wire harness W' for electrically connecting the functional parts 63 to 66. A movable connector 67 is attached to the trim wire harness W' at one end thereof to connect the same to the connector 50 of the door concentrated unit 44. Reference numeral 68 indicates the cover of the speaker and reference numeral 69 indicates the cover of the courtesy lamp 64.

Figure 8A:
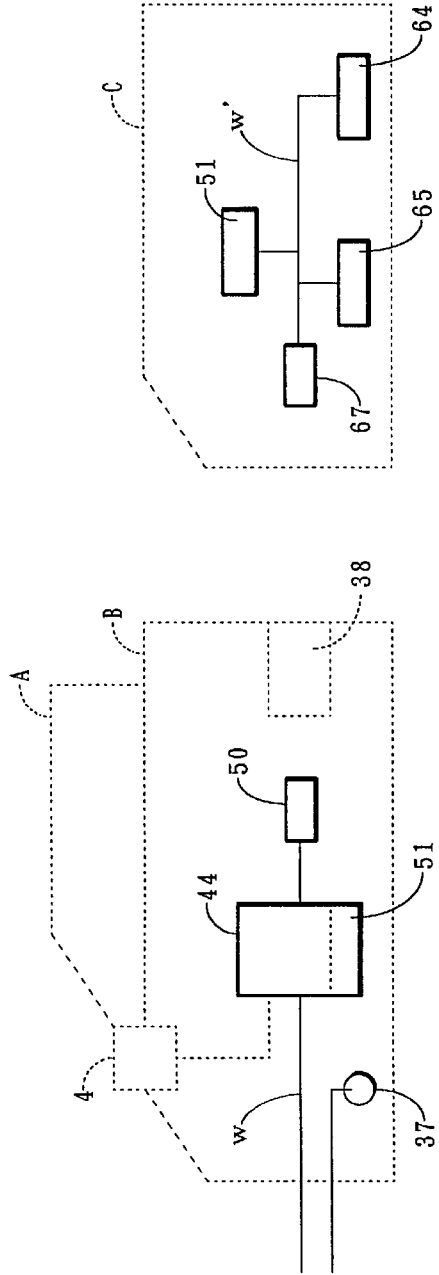
FIG. 8A is a block diagram illustrating a system arranged on the automobile door according to the present invention.
Figure 8B:
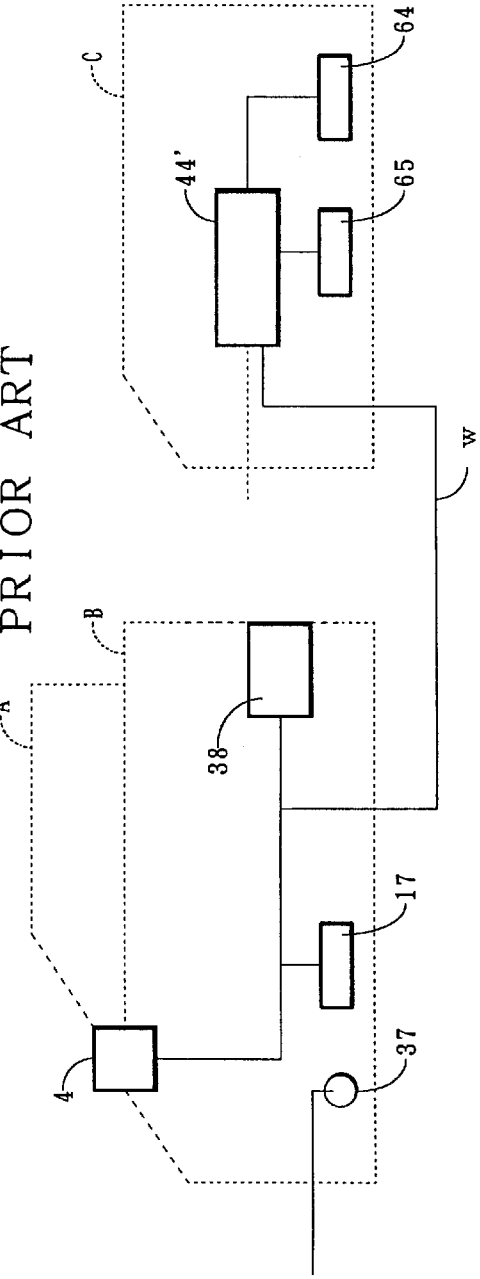
FIG. 8B is a block diagram illustrating conventional counterpart of FIG. 8A.

FIGS. 8A and 8B are block diagrams illustrating respectively novel and conventional systems for controlling the operations of door functional parts.

Referring to FIG. 8A, according to the present invention, the door wire harness is divided into two parts as described above; the panel wire harness W and the trim wire harness W'. The door functional parts such as the door mirror 4, the speaker 37, the door lock unit 38, the courtesy lamp 64, and the foot lamp 65 are controlled by the door concentrated unit 44 in the inner panel B installed with a switch-incorporated electronics module, or the power window switch unit 51. A motor 38a (FIGS. 9A, 9B) for the door lock unit 38 is also controlled by the door concentrated unit 44.

Conventionally, however, the above-mentioned functional parts are controlled by a switch and electronics module 44' in the decoration panel C which are electrically connected by one door wire harness "w" having many branch wire sections as shown in FIG. 8B.

Figure 9A:
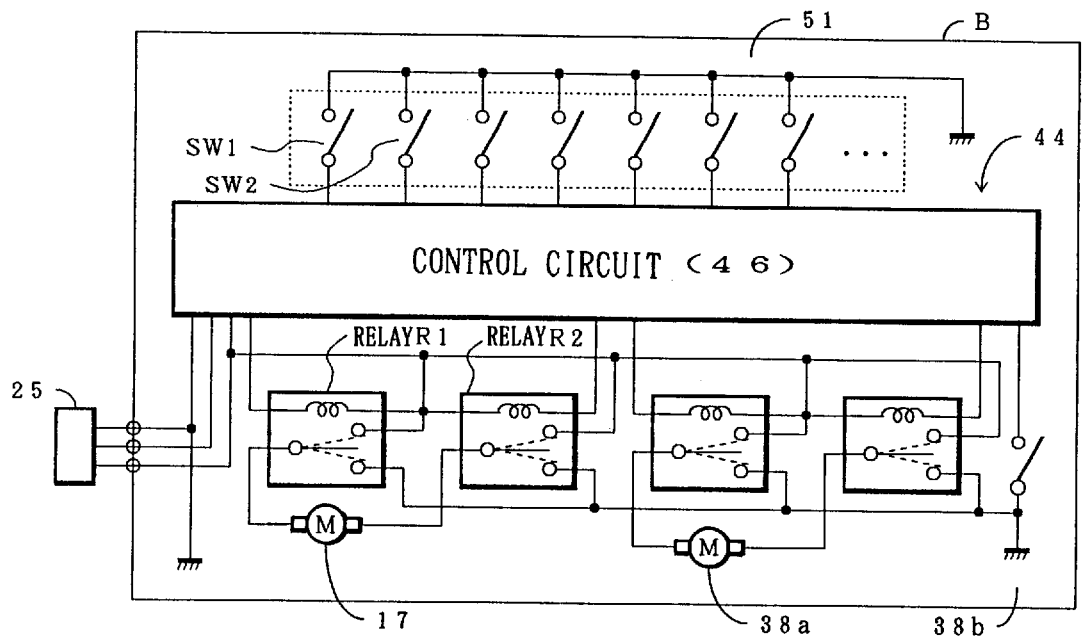
FIG. 9A is a circuit diagram illustrating a switch unit and door functional parts arranged on the automobile door according to the present invention.
Figure 9B:
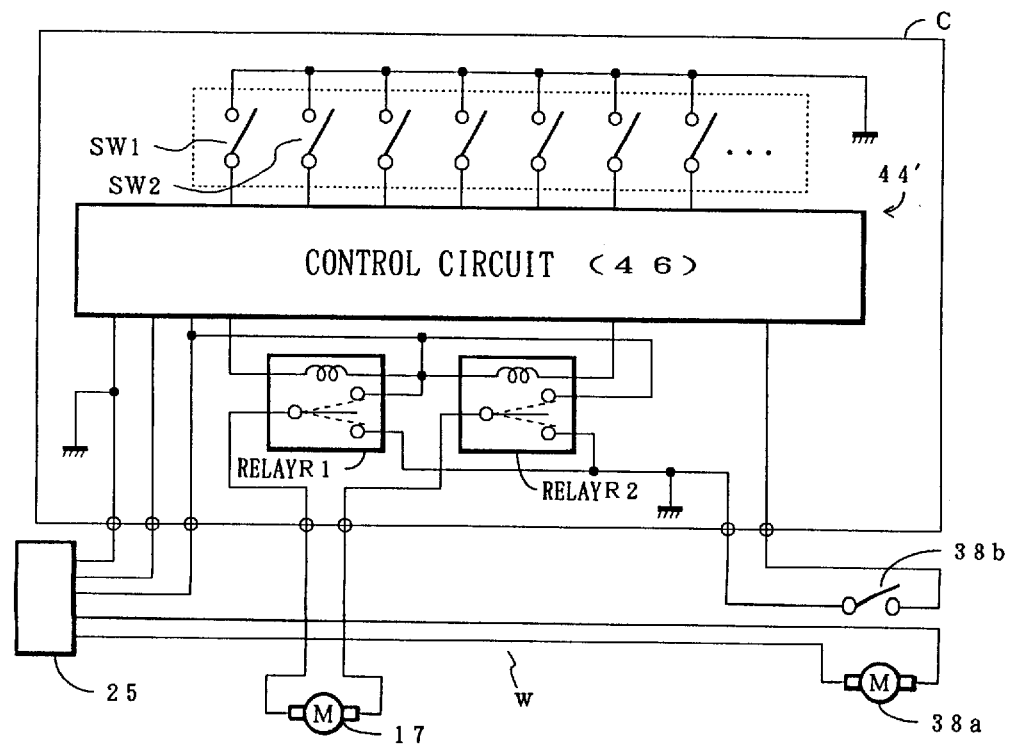
FIG. 9B is a circuit diagram illustrating conventional counterpart of FIG. 9A.
Figure 10:
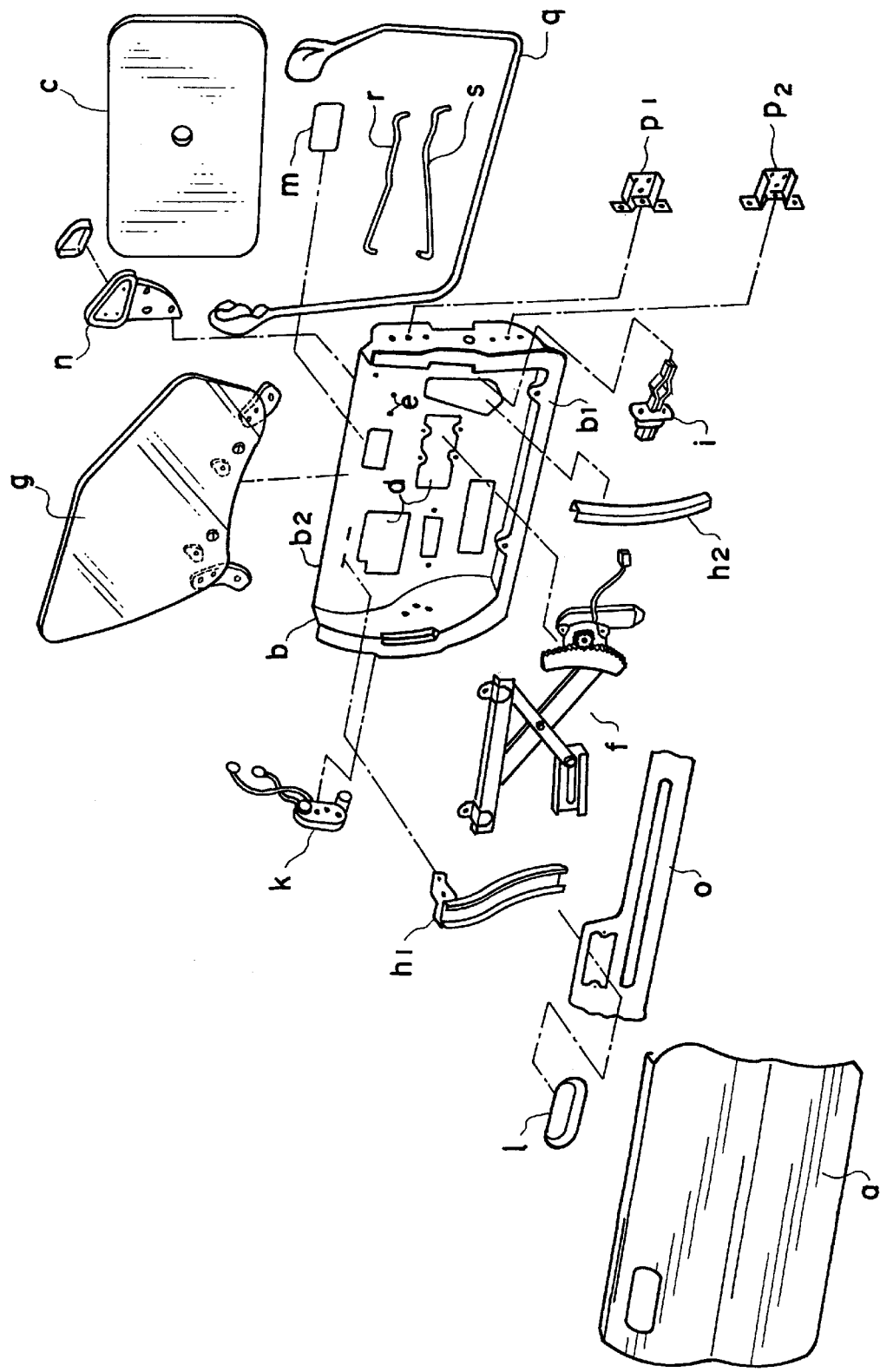
FIG. 10 is an exploded perspective view illustrating a conventional automobile door.

FIG. 9A is a main circuit diagram illustrating the switch unit and door functional parts installed on the automobile door according to the present invention. FIG. 9B shows the conventional counterpart.

According to the present invention, door functional parts such as the power window motor 17, the door lock motor 38a and a door lock sensor 38b that constitute the door lock unit 38 are all arranged inside the inner panel B along with the door concentrated unit 44 and the power window switch unit 51, which are the control circuit sections. And these are all connected with the panel wire harness W, resulting in a simplified constitution of the door wire harness itself.

On the contrary, referring to FIG. 9B, the prior technique houses the switch and electronics module 44' for controlling the door functional parts in the decoration panel C; that is, the power window motor 17, the door lock motor 38a, the door lock sensor 38b, and so forth are housed in a door panel separate from the decoration panel C', resulting in the long and complicated door wire harness as compared with the present invention.

As seen from FIGS. 9A and 9B, connection to the power window motor 17 and the door lock motor 38a conventionally requires a task of passing the door wire harness "w" through a door panel hole. According to the present invention, however, the motors 17 and 38a are concentratedly arranged in the inner panel B, so that the wiring, or the wire harness to be specific, from relay R1 and relay R2 to the door functional parts is substantially eliminated. Control can be performed only by the door concentrated unit 44, or the printed circuit board 46 to be specific. In FIGS. 9A and 9B, operating switch SW1 energizes the relay R1 to raise the window glass 34 and operating switch SW2 energizes the relay R2 to lower the window glass 34, by way of example.

As seen from the comparisons between FIG. 8A and FIG. 8B and between FIG. 9A and FIG. 9B, the conventional door wire harness "w" has many branch wires and therefore complicated in form, requiring use of various door wire harnesses in accordance with the grades of automobiles.

In the present invention, door functional parts are mostly concentratedly arranged in the inner panel B, thereby significantly simplifying the door wire harness. Based on this simplification, those door functional parts which are high in standardization may be arranged in the inner panel B while arranging those functional parts which are high in optionality in the decoration panel C. This allows the handling of option grades to be done by the trim wire harness W', thereby standardizing the panel wire harnesses.

Thus, in the present invention, the inner panel B is mounted in advance with most of the door functional parts and such means of electrically connecting these parts as the panel wire harness W and the connectors 25, 29 and 50. Consequently, automobile manufactures may only fix the inner panel B to the outer panel A, connect the movable connector 5 of the door mirror 4 with the connector 29 of the branch wire W1, over which the decoration panel C is mounted and the connector 50 of the door concentrated unit 44 is connected to the movable connector 67 of the trim wire harness W' to complete the assembly of the door. The terminal connector 25 of the panel wire harness W is connected with the connector of a cowl-side wire harness not shown. It will be apparent to those skilled in the art that the preassembled inner panel B and decoration panel C may be mounted on the outer panel A.

As described above, with the present invention, the following advantages are obtained.

The fabrication of the door panel itself is made easy to enhance ease of assembling the door functional parts.

The enhanced mechanical strength of the door panel realized by reinforcing the resin panel with a structural iron sheet increases the number of door functional parts that can be mounted on the door panel.

Insert molding of the inner panel with the metal main panel used as the base allows use of less costly resin materials. Further, because the resin portion, or the sub panel to be specific, can be formed thinner, a light-weight door will result.

The control circuit is arranged concentratedly in the inner panel and the door wire harness is divided into several portions, resulting in the simplified wire harness.

The functions of the door functional parts are complete only in the door panels, allowing the inspection thereof independently of the automobile main for simplified inspection.

While the preferred embodiment of the present invention has been described using specific terms, such description is for illustrative purposes only, and it is to be understood that changes and variations may be made without departing from the spirit or scope of the appended claims.

What is claimed is:

1. An automobile door comprising:

an outer panel; and an inner panel mounted on said outer panel, said inner panel being comprised of a resin-molded sub-panel which is produced integrally with a main panel made of metal, of a generally flat panel shape extending substantially the length of said outer panel and having an opening in a central portion thereof, so as to encase substantially completely the main panel, said resin-molded sub-panel being formed integrally with, and extending parallel with, said main panel made of metal.

2. The automobile door as claimed in claim 1, wherein said inner panel is integrally molded with a mount, on which door functional parts to be mounted on said automobile door are installed, and with electrical connecting means to electrically connect said door functional parts to each other.

3. The automobile door as claimed in claim 1, wherein a decoration panel is attached to said inner panel on an interior side of said automobile door.

4. The automobile door as claimed in claim 2, wherein a decoration panel is attached to said inner panel on an interior side of said automobile door.

5. The automobile door as claimed in claim 1, wherein said mount is assembled with a concentrated unit incorporating a control circuit for controlling said door functional parts.

6. The automobile door as claimed in claim 3, further comprising a door wire harness which is divided into a panel wire harness and a trim wire harness, wherein said panel wire harness is arranged on said inner panel and said trim wire harness is arranged on said decoration panel.

7. The automobile door as claimed in claim 4, wherein said mount is assembled with a concentrated unit incorporating a control circuit for controlling said door functional parts.

8. The automobile door as claimed in claim 4, further comprising a door wire harness which is divided into a panel wire harness and a trim wire harness, wherein said panel wire harness is arranged on said inner panel and said trim wire harness is arranged on said decoration panel.

9. The automobile door as claimed in claim 5, wherein said concentrated unit is mounted with a switch unit associated with said door functional parts.

10. The automobile door as claimed in claim 5, wherein said concentrated unit is mounted with a power window motor and a door lock motor.

11. The automobile door as claimed in claim 7, wherein said concentrated unit is mounted with a switch unit associated with said door functional parts.

12. The automobile door as claimed in claim 7, wherein said concentrated unit is mounted with a power window motor and a door lock motor.

* * * * *